United States Patent
Stettler, Jr.

(10) Patent No.: US 6,830,526 B2
(45) Date of Patent: Dec. 14, 2004

(54) TWO-SPEED PLANETARY TRANSMISSION WITH SINGULAR ACTUATOR

(75) Inventor: Werner Stettler, Jr., Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/339,690

(22) Filed: Jan. 9, 2003

(65) Prior Publication Data
US 2004/0138021 A1 Jul. 15, 2004

(51) Int. Cl.[7] .............................................. F16H 31/00
(52) U.S. Cl. ....................... 475/142; 475/140; 475/315; 475/316
(58) Field of Search ................. 475/142, 140, 475/315, 316

(56) References Cited

U.S. PATENT DOCUMENTS

| | | | | |
|---|---|---|---|---|
| 2,559,923 A | * | 7/1951 | Shellenbarger | 475/258 |
| 2,870,655 A | * | 1/1959 | Rockwell | 475/142 |
| 3,929,037 A | | 12/1975 | Marsch | |
| 3,954,028 A | * | 5/1976 | Windish | 475/328 |
| 4,296,650 A | * | 10/1981 | Kalns | 475/140 |
| 4,484,494 A | * | 11/1984 | Sakakibara | 475/312 |
| 4,528,872 A | | 7/1985 | Umemoto et al. | |
| 4,532,827 A | | 8/1985 | Beim | |
| 4,649,771 A | * | 3/1987 | Atkinson et al. | 475/139 |
| 4,787,271 A | * | 11/1988 | Brogdon | 475/140 |
| 5,026,334 A | | 6/1991 | Jeffries | |
| 5,462,147 A | | 10/1995 | Sherman | |
| 5,538,482 A | * | 7/1996 | Tanzer et al. | 475/316 |

FOREIGN PATENT DOCUMENTS

| | | | | | |
|---|---|---|---|---|---|
| GB | 2062140 A | * | 5/1981 | | F16H/3/54 |
| JP | 57061848 A | * | 4/1982 | | F16H/3/54 |
| JP | 58131454 A | * | 8/1983 | | F16H/3/62 |

* cited by examiner

Primary Examiner—Roger Pang
Assistant Examiner—David D. Le

(57) ABSTRACT

A transmission is provided having a sun gear, ring gear and planet carrier mounted in a housing. A plurality of planet gears are rotatably mounted to the planet carrier. The planet carrier is connected to one of either an input shaft or an output shaft while the ring gear is connected to the other of either the input shaft or output shaft. A clutch engageably and disengageably couples the sun gear for rotation with one of the input or output shafts to which the planet carrier is coupled. A brake engageably and disengageably fixes the sun gear against rotation relative to the housing. A hydraulically engaged/spring disengaged non-rotating piston is mounted in the housing and is slidable in response to fluid pressure between an engaged position for engaging one of the clutch and the brake and a retracted position for disengaging the one of the clutch and the brake.

24 Claims, 1 Drawing Sheet

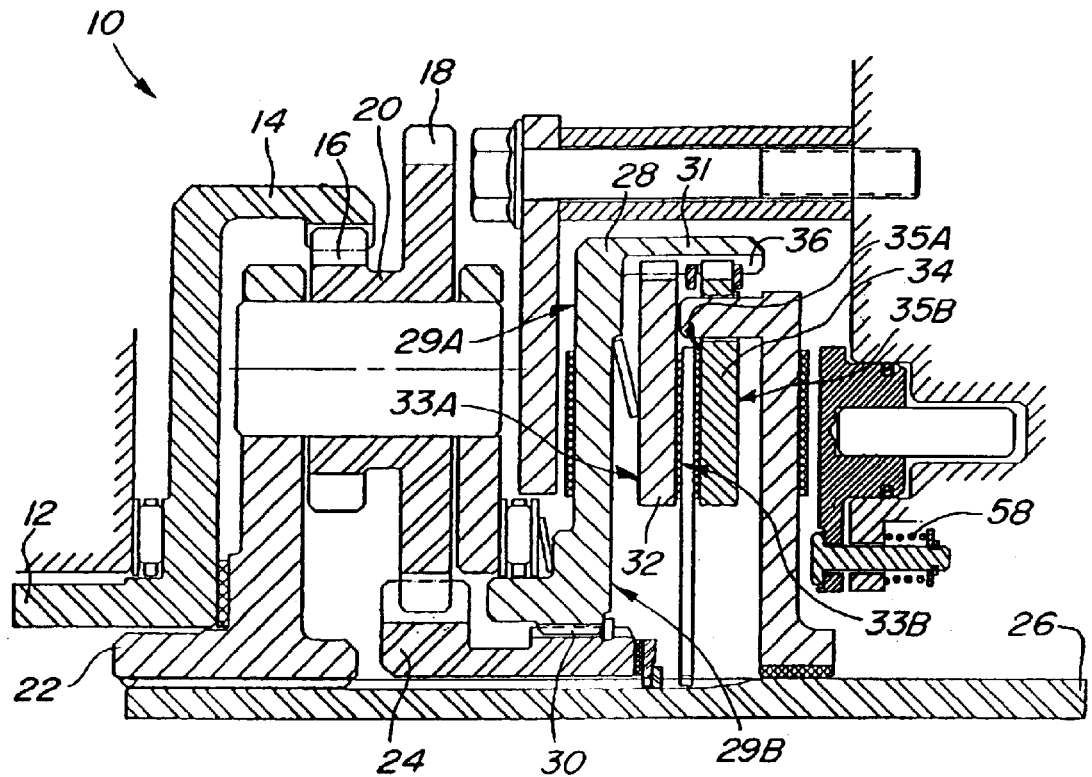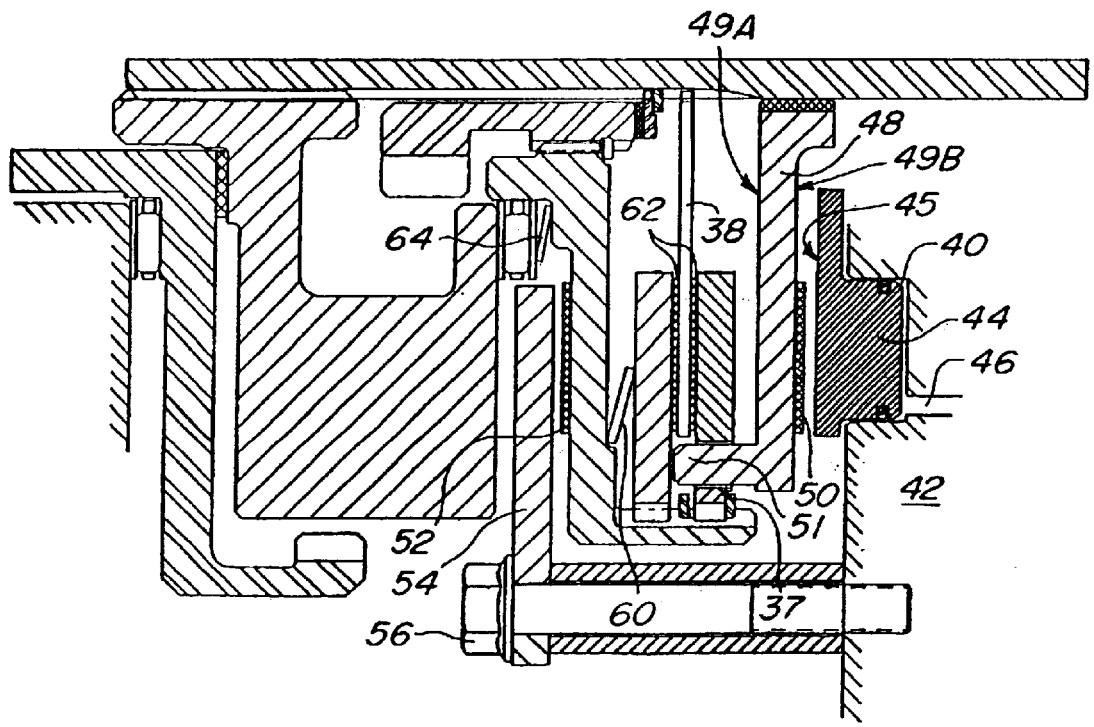

TWO-SPEED PLANETARY TRANSMISSION WITH SINGULAR ACTUATOR

FIELD OF THE INVENTION

The present invention relates generally to transmissions. More particularly, the present invention relates to planetary gear transmissions. Specifically, the present invention relates to the mechanisms for activating a brake and/or clutch used to control a planetary transmission.

BACKGROUND OF THE INVENTION

A typical planetary gear transmission has components including at least one sun gear, at least one ring gear and a planet carrier with a plurality of planet gears rotatably mounted thereon, with the planet gears engaging one of the ring gears and/or one of the sun gears. It is known in the art to connect the input and output of the planetary gear transmission to varying combinations of the sun gears, the planet carrier, or the ring gears, depending upon the precise transmission characteristics desired. The typical planetary gear transmission is shifted between different gear ratios by using a clutch to connect pairs of one of the sun gears, planet carrier, or one of the ring gears against relative rotation, and/or by using a brake to fix one of the sun gears, the planet carrier or one of the ring gears against rotation relative to the transmission housing.

When both a clutch and a brake are used, a common control mechanism is typically a spring-biased hydraulic piston to control the brake and a separate spring-biased hydraulic piston to control the clutch. Depending upon the exact characteristics desired, the springs for the pistons can either bias the corresponding components into engagement or out of engagement, with hydraulic fluid being then applied to the piston to disengage or engage the component, as desired.

In most situations, it is undesirable to completely simultaneously engage the brake and clutch. Accordingly, when separate spring-biased hydraulic pistons are used to control the clutch and the brake, the timing of application of hydraulic fluid to the pistons for the two control mechanisms must be carefully controlled. Thus the control valve structure for these fluids must be very precisely designed and manufactured to ensure that this timing is correct.

Previously it has been known as an alternative to use a single piston to control both the clutch and brake. In such mechanisms a piston is spring biased to engage one of the components (clutch or brake) and disengage the second component, and hydraulically activated to disengage the first component and engage the second component, such that the brake and clutch will not both be completely engaged at the same time. However, it is still generally necessary that the clutch and brake never be fully disengaged simultaneously, or, if they must be, that they both be disengaged for very short time. In transmissions of the type discussed above, if the clutch and brake are disengaged and there is a load on the output while power is supplied to the input, the output will stop rotating. The result is that the component to which the brake is connected will rotate at a very high rate of speed. In some cases, depending on the gear ratios and the strength of the parts, among other things, the component to which the brake is connected (or rotating parts attached to it) can fail due to the loads imposed by centrifugal force.

Thus it is desirable that the engaging element start engaging before the disengaging element becomes fully disengaged. One conventional method for minimizing the time that a clutch and brake will be simultaneously disengaged involves a transmission where both the clutch and brake are engaged by separate pistons using fluid pressure to engage its associated clutch or brake. A control valve is manually controlled by the operator, introducing a risk that the valve will be moved slowly, resulting in the possibility that both clutches will be simultaneously engaged or disengaged. To avoid this occurrence, a second valve is used. The valve controlled by the operator controls only the second valve, which then directs fluid pressure to the appropriate clutch or brake. The second valve is strongly detented in each of two positions so that once it starts moving, it will complete its travel very rapidly. This serves to minimize but not eliminate the time that the clutch and brake will be simultaneously engaged or disengaged. In addition, this method involves the use of more than one piston to activate the clutch and brake.

A second conventional method for minimizing simultaneous disengagement of a clutch and brake is to use a spring to engage either the clutch or brake. This spring-engaged clutch or brake is disengaged by a piston activated by fluid pressure. The other clutch or brake is engaged by a second piston activated by fluid pressure. Fluid pressure is applied to or released from both pistons simultaneously, as fluid is supplied by one valve to both pistons. This provides relatively dependable phasing of the clutching elements during the shift, but requires multiple pistons and carefully designed control valves.

Accordingly, there is a clear need in the art for a transmission having a single actuator for simultaneously engaging/disengaging the clutch and brake.

SUMMARY OF THE INVENTION

In view of the foregoing, it is an object of the invention to provide a mechanism which can fully activate only one or the other of the brake and clutch of a planetary transmission at a time, without requiring overly cumbersome design and manufacture of control valves for the structure.

Another object of the invention is the provision of such a mechanism which ensures that the clutch and brake are not fully deactivated simultaneously.

A further object of the invention is to provide a two-speed planetary transmission with shifting activated by a single, non-rotating piston.

The foregoing and other objects of the invention together with the advantages thereof over the known art which will become apparent from the detailed specification which follows are attained by a planetary gear transmission comprising: a transmission housing; a sun gear mounted in the housing; a ring gear mounted in the housing; a planet carrier mounted in the housing; at least one planet gear rotatably mounted to the planet carrier and engaged with the sun gear; at least one planet gear rotatably mounted to the planet carrier and engaged with the ring gear; a brake for selectively braking one of the sun gear, the ring gear and the planet carrier against rotation relative to the transmission housing; a clutch for selectively clutching together two of the sun gear, the ring gear and the planet carrier to prevent relative motion therebetween; an actuator coupled to the brake and the clutch, the actuator movable between a braking position wherein the brake is fully engaged and the clutch is fully disengaged, a clutching position wherein the clutch is fully engaged and the brake is fully disengaged, and a plurality of intermediate positions wherein at least one of the clutch and the brake is always at least partially engaged.

Other objects of the invention are attained by a planetary gear transmission comprising: a housing having a piston chamber, the piston chamber being in fluid communication with a source of fluid pressure; input and output shafts rotatably mounted in the housing; a planet carrier coupled to one of the input and output shafts for rotation therewith; a set of compound planetary gears rotatably carried by the planet carrier, each compound planetary gear of the set of compound planetary gears comprising first and second planet gears rotatable about a common axis and fixed against rotation relative to each other, the first and second planet gears forming first and second planetary gearsets; a ring gear encircling the set of compound planet gears and meshing with one of the first and second planet gearsets, the ring gear coupled for rotation with the one of the input and output shafts to which the planet carrier is not coupled; a sun gear mounted for rotation about one of the input and output shafts and meshing with one of the planet gears; a clutch engageably and disengageably coupling the sun gear for rotation with the one of the input and output shafts to which the planet carrier is coupled; a brake engageably and disengageably fixing the sun gear against rotation relative to the housing; a piston mounted in the piston chamber and slidable in response to fluid pressure between an engaged position for engaging one of the clutch and the brake and a retracted position for disengaging the one of the clutch and the brake.

Still other objects of the invention are attained by a planetary gear transmission comprising: a transmission housing; a sun gear mounted in the housing; a ring gear mounted in the housing; a planet carrier mounted in the housing; an input shaft connected to the ring gear; an output shaft connected to the planet carrier; at least one planetary gear rotatably mounted to the planet carrier and engaged with the sun gear; at least one planetary gear rotatably mounted to the planet carrier and engaged with the ring gear; a clutch drum connected to the sun gear, the clutch drum having first and second sides, the first side having a friction disc affixed thereto; a clutch pressure plate connected to the clutch drum, the clutch pressure plate having first and second sides, the second side having a friction disc affixed thereto; a clutch backing plate connected to the clutch drum, the clutch backing plate having a plurality of apertures therein, the clutch backing plate also having first and second sides, the first side having a friction disc affixed thereto; a clutch disc interposed between the second side of the clutch pressure plate and the first side of the clutch backing plate and affixed to the output shaft; a clutch release plate having first and second sides with a plurality of projections extending from the first side, the plurality of projections matingly engaging the plurality of apertures in the clutch backing plate and extending therethrough, the clutch release plate also having a friction disc affixed to the second side thereof; a housing extension rigidly affixed to the housing and interposed between the planet carrier and the first side of the clutch drum; a piston cavity formed in the housing, the piston cavity having a hydraulic passage in fluid communication with a source of fluid pressure; a piston slidably disposed in the piston cavity, the piston having a contact face opposing the friction disc and second side of the clutch release plate; a clutch apply spring interposed between the second side of the clutch drum and the first side of the clutch pressure plate; and, a brake return spring interposed between the first side of the clutch drum and the planet carrier; whereby the clutch pressure plate is biased into engagement with the clutch disc by the clutch apply spring and when pressurized hydraulic fluid is introduced into the piston cavity, the piston is moved into engagement with the clutch release plate at which point the projections extending through the clutch backing plate engage the clutch pressure plate thereby overcoming a bias force provided by the clutch apply spring and moving the clutch pressure plate out of engagement with the clutch disc and simultaneously moving the clutch drum into engagement with the housing extension to provide braking of the sun gear thereby slowing the planet carrier and the output and when fluid is drained from the piston cavity the brake return spring moves the clutch drum out of engagement with the housing extension and simultaneously the clutch apply spring moves the clutch pressure plate back into engagement with the clutch disc causing all elements of the transmission to rotate at the same speed resulting in a direct drive.

In general, a planetary gear transmission is provided having a sun gear, ring gear and planet carrier mounted in a housing. A plurality of compound planet gears are rotatably mounted to the planet carrier. The planet carrier is connected to one of either an input shaft or an output shaft while the ring gear is connected to the other of either the input shaft or output shaft. A clutch engageably and disengageably couples the sun gear for rotation with one of the input or output shafts to which the planet carrier is coupled. A brake engageably and disengageably fixes the sun gear against rotation relative to the housing. A hydraulically engaged/spring disengaged non-rotating piston is mounted in the housing and is slidable in response to fluid pressure between an engaged position for engaging one of the clutch and the brake and a retracted position for disengaging the one of the clutch and the brake. Whereby the transmission operates in a first range when the clutch is engaged and the brake is disengaged and operates in a second range when the brake is engaged and the clutch is disengaged.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein:

The single drawing FIGURE illustrates a typical structure for a two-speed planetary transmission having a single actuator according to the present invention.

DESCRIPTION OF THE PREFERRED EMBODIMENT

The drawing FIGURE illustrates a preferred embodiment of the present invention. A two-speed power-shifted transmission is shown comprising a planetary gearset, a clutch, a brake, a spring to engage one of the brake and the clutch, a hydraulically actuated piston and the associated elements to control the piston and a housing to contain the transmission.

In this particular embodiment, the planetary transmission 10 is driven via input shaft 12, which is connected to a ring gear 14. The ring gear 14 is coupled to a first planet gear 16, which is fixed to a second planet gear 18 against relative rotation, forming one of a plurality of compound planet gears 20. The compound planet gears 20 are rotatably mounted to a planet carrier 22. A sun gear 24 is coupled to the second planet gear 18 of each of the compound planet gears 20 in the usual manner. Power is drawn from the planetary transmission 10 by an output shaft 26 which is connected to the planet carrier 22.

The sun gear 24 has a clutch drum 28 which is coupled to the sun gear 24 by splines 30 on a radially inward portion thereof. Clutch drum 28 has first and second sides 29A and 29B respectively with a friction disc 52 affixed to first side 29A. A clutch pressure plate 32 and a clutch backing plate 34 are fixed to a drum portion 31 of the clutch drum 28 by splines 36 and rotate with the clutch drum 28 about the output shaft 26. Clutch pressure plate 32 has first and second sides 33A and 33B respectively, while clutch backing plate 34 has first and second sides 35A and 35B respectively. Clutch backing plate 34 further includes a plurality of apertures 37 therein. A clutch disc 38 is disposed between the second side 33B of clutch pressure plate 32 and the first side 35A of clutch backing plate 34 and is splined to the output shaft 26 for rotation therewith. Friction discs 62A and 62B are affixed to the second side 33B of clutch pressure plate 32 and first side 35A of clutch backing plate 34 respectively.

A piston cavity 40 is formed in the transmission housing 42 and has a piston 44 slidably disposed therein. Piston 44 has a face 45 disposed outside the piston cavity 40. A hydraulic fluid passage 46 is provided within the housing 42 terminating in the piston cavity 40 behind the piston 44. Fluid passage 46 is in fluid communication with a source of fluid pressure (not shown). The piston cavity 40 can be provided with pressurized hydraulic fluid or drained of fluid in the usual fashion (which is well known to one skilled in the art and therefore will not be described further herein) to urge the piston 44 towards a clutch release plate 48, or to allow the piston 44 to be moved further into the piston cavity 40. A piston return spring assembly 58 is provided for the purpose of retracting the piston 44 into the piston cavity 40 when hydraulic pressure is released in the piston cavity 40.

A clutch release plate 48 having first and second sides 49A and 49B respectively is disposed in the housing 42 between the face 45 of piston 44 and the second side 35B of the clutch backing plate 34. A plurality of projections 51 extend from the first side 49A of the clutch release plate and matingly engage the plurality of apertures 37 in the clutch backing plate 34 to extend there through. A friction disc 50 is affixed to the second side 49B of the clutch release plate 48.

A clutch apply spring 60 is interposed between the first side 33A of the clutch-pressure plate 32 and the second side 29B of the clutch drum 28. Similarly, a brake return spring 64 is interposed between the first side 29A of the clutch drum 28 and the planet carrier 22. Clutch apply spring 60 and brake return spring 64 are preferably in the form of Belleville washers.

Activation of the piston 44 by provision of pressurized hydraulic fluid to the cavity 40 will cause the face 45 of piston 44 to move into engagement with the friction disc 50 on the clutch release plate 48. This simultaneously will release the engagement of the clutch pressure plate 32 with the clutch disc 38 as the projections 51 engage the second side 33B thereof and cause the brake facing 52 to engage the housing extension 54.

In the transmission 10, the input is to the ring gear 14, the output is from the planet carrier 22, and the sun gear 24 is controlled by the clutch and brake. In operation, if no hydraulic pressure is applied to the piston 44, the piston 44 is retracted by piston return spring 58. In this condition, the clutch apply spring 60 engages the clutch so that all the elements of the planetary gearset rotate at the same rate, resulting in a direct drive. As fluid flows to the piston cavity 40, the piston 44 moves forward and contacts the friction disc 50. As the pressure on the piston 44 increases, more force is applied to the friction disc 50 and clutch release plate 48, and commensurately less pressure is applied to the friction discs 62. When full pressure is applied to the piston 44, the brake will be fully engaged and the clutch will be fully disengaged. When the brake is fully engaged and the clutch fully disengaged, the sun gear 24 is prevented from rotating, and the carrier 22 rotates slower than the input ring gear 14. As a result of the clutch force decreasing at substantially the same rate as the brake force is decreasing, at no time will both clutch and brake be either fully engaged or disengaged.

The advantage of this invention is that it provides a way to ensure that the clutch and brake will not be fully engaged or fully disengaged simultaneously, while requiring only one piston. Because the force that engages the brake is transferred to the spring 60 that engages the clutch, reducing the force on the friction discs 62 by a like amount, this ensures that the clutch and brake will not be either fully engaged or fully disengaged simultaneously. It also ensures that the phasing will be consistent during the shift. The phasing will be very similar to the system which uses one spring engaged/ hydraulically released and one hydraulically engaged clutching elements, but with fewer parts and less complexity.

A second advantage of this invention is that the one piston 44 that is used is located in a housing that does not rotate. In the more common arrangement, where a clutch piston is located in a rotating housing, rotating seals and rather complex fluid routing passages are required.

A third advantage of this invention arises from the fact that the piston 44 does not rotate. If the power transmitted is suitably low, and the clutch and brake forces are suitably low, the fluid activated piston can be replaced with an appropriately designed manually activated mechanical linkage, which would further reduce cost and complexity.

The other elements of the planetary shown in the drawing, e.g., bearings, lubrication systems and the like, are well known to those of ordinary skill in the art, and therefore will not be described further herein.

Various modifications will readily be apparent to one of ordinary skill in the art. For example, while the structure illustrated in the drawing provides input to the planetary carrier, draws output from the ring gear and uses a brake and clutch to control rotation of the sun gear relative to the transmission housing and planetary carrier, numerous other connections could be made by one of ordinary skill in the art without deviating from the scope of the present invention. Similarly, while the invention has been shown spring-biased to engage the clutch and hydraulically activated to engage the brake, these features could be reversed as desired for a particular application.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A planetary gear transmission comprising:
   a transmission housing;
   a sun gear mounted in the housing;
   a ring gear mounted in the housing;
   a planet carrier mounted in the housing;
   at least one planet gear rotatably mounted to the planet carrier and engaged with the sun gear;
   at least one planet gear rotatably mounted to the planet carrier and engaged with the ring gear;
   a brake for selectively braking one of the sun gear, the ring gear and the planet carrier against rotation relative to the transmission housing;
   a clutch for selectively clutching together two of the sun gear, the ring gear and the planet carrier to prevent relative motion therebetween, the clutch comprising a clutch drum fixed for rotation with the sun gear, a clutch backing plate rigidly affixed to the clutch drum, the clutch backing plate having a plurality of apertures therein, a clutch pressure plate movably engaging the clutch drum, a clutch release plate having a plurality of projections matingly engaging the plurality of apertures in the clutch backing plate and extending completely therethrough;
   an actuator coupled to the brake and the clutch, the actuator movable between a braking position wherein the brake is fully engaged and the clutch is fully disengaged, a clutching position wherein the clutch is fully engaged and the brake is fully disengaged, and a plurality of intermediate positions wherein at least one of the clutch and the brake is always at least partially engaged, the clutch release plate being disposed in the housing adjacent to the actuator such that the actuator selectively moves the clutch release plate to disengage the clutch pressure plate from the clutch disc.

2. The planetary gear transmission of claim 1 wherein the actuator is fixed to the housing against relative rotation.

3. The planetary gear transmission of claim 2 wherein the actuator comprises a piston movable between an activation position fully engaging one of the brake and the clutch, and a retracted position wherein the one of said brake and said clutch is fully disengaged.

4. The planetary gear transmission of claim 3 wherein the actuator further comprises a spring coupled to the piston for biasing the piston toward its retracted position.

5. The planetary gear transmission of claim 4 wherein the actuator further comprises a fluid passage formed in the transmission housing, said fluid passage in fluid communication with the piston for moving the piston toward one of said braking and clutching positions.

6. The planetary gear transmission of claim 4 wherein the actuator further comprises means for providing the supply of pressurized hydraulic fluid to the hydraulic chamber to move the piston towards the activation position and for draining hydraulic fluid from the hydraulic chamber to allow the spring to move the piston towards the retracted position.

7. The planetary gear transmission of claim 2 wherein the clutch further comprises;
   a clutch disc interposed between the clutch backing plate and the clutch pressure plate and fixed for rotation with an output shaft of the transmission; and,
   a clutch apply spring interposed between the clutch drum and the clutch pressure plate to bias the clutch pressure plate into engagement with the clutch disc.

8. The planetary gear transmission of claim 7 wherein the clutch further comprises friction discs affixed to the clutch backing plate and the clutch pressure plate for frictionally engaging the clutch disc.

9. The planetary gear transmission of claim 7 wherein the clutch apply spring is a Belleville type washer.

10. The planetary gear transmission of claim 7 wherein the brake comprises:
    a housing extension rigidly affixed to the transmission housing and interposed between the planet carrier and the clutch drum;
    a brake return spring interposed between the planet carrier and the clutch drum, the brake return spring further biasing the clutch drum and the clutch pressure plate into engagement with the clutch disc, such that when the actuator moves the clutch pressure plate the clutch drum is also moved into frictional engagement with the housing extension.

11. The planetary gear transmission of claim 10 wherein the brake return spring is a Belleville type washer.

12. The planetary gear transmission of claim 10 wherein the brake further comprises a friction disc affixed to the clutch drum for frictionally engaging the housing extension.

13. A planetary gear transmission comprising:
    a housing having a piston chamber, the piston chamber being in fluid communication with a source of fluid pressure;
    input and output shafts rotatably mounted in the housing;
    a planet carrier coupled to one of the input and output shafts for rotation therewith;
    a set of compound planetary gears rotatably carried by the planet carrier, each compound planetary gear of the set of compound planetary gears comprising first and second planet gears rotatable about a common axis and fixed against rotation relative to each other, the first and second planet gears forming first and second planetary gearsets;
    a ring gear encircling the set of compound planet gears and meshing with one of the first and second planet gearsets, the ring gear coupled for rotation with the one of the input and output shafts to which the planet carrier is not coupled;
    a sun gear mounted for rotation about one of the input and output shafts and meshing with one of the planet gears;
    a clutch engageably and disengageably coupling the sun gear for rotation with the one of the input and output shafts to which the planet carrier is coupled, the clutch comprising a clutch drum fixed for rotation with the sun gear, a clutch backing plate rigidly affixed to the clutch drum, the clutch backing plate having a plurality of apertures therein, a clutch pressure elate movably engaging the clutch drum a clutch release plate having a plurality of projections matingly engaging the plurality of apertures in the clutch backing plate and extending completely therethrough;
    a brake engageably and disengageably fixing the sun gear against rotation relative to the housing;

a piston mounted in the piston chamber and slidable in response to fluid pressure between an engaged position for engaging one of the clutch and the brake and a retracted position for disengaging the one of the clutch and the brake, the clutch release plate being disposed in the housing adjacent to the piston such that the piston selectively moves the clutch release plate to disengage the clutch pressure elate from the clutch disc.

14. The planetary gear transmission of claim 13 wherein the piston is fixed to the housing against relative rotation.

15. The planetary gear transmission of claim 14 wherein the piston is movable between an activation position fully engaging one of the brake and the clutch, and a retracted position wherein the one of said brake and said clutch is fully disengaged.

16. The planetary gear transmission of claim 15 further comprising a spring coupled to the piston for biasing the piston toward its retracted position.

17. The planetary gear transmission of claim 16 further comprising means for providing the supply of pressurized hydraulic fluid to the hydraulic chamber to move the piston towards the activation position and for draining hydraulic fluid from the hydraulic chamber to allow the spring to move the piston towards the retracted position.

18. The planetary gear transmission of claim 14 wherein the clutch further comprises:
   a clutch disc interposed between the clutch backing plate and the clutch pressure plate and fixed for rotation with the output shaft; and
   a clutch apply spring interposed between the clutch drum and the clutch pressure plate to bias the clutch pressure plate into engagement with the clutch disc.

19. The planetary gear transmission of claim 18 wherein the clutch further comprises friction discs affixed to the clutch backing plate and the clutch pressure plate for frictionally engaging the clutch disc.

20. The planetary gear transmission of claim 18 wherein the clutch apply spring is a Belleville type washer.

21. The planetary gear transmission of claim 18 wherein the brake comprises:
   a housing extension rigidly affixed to the transmission housing and interposed between the planet carrier and the clutch drum;
   a brake return spring interposed between the planet carrier and the clutch drum, the brake return spring further biasing the clutch drum and the clutch pressure plate into engagement with the clutch disc, such that when the piston moves the clutch pressure plate the clutch drum is also moved into frictional engagement with the housing extension.

22. The planetary gear transmission of claim 21 wherein the brake return spring is a Belleville type washer.

23. The planetary gear transmission of claim 21 wherein the brake further comprises a friction disc affixed to the clutch drum for frictionally engaging the housing extension.

24. A planetary gear transmission comprising:
   a transmission housing;
   a sun gear mounted in the housing;
   a ring gear mounted in the housing;
   a planet carrier mounted in the housing;
   an input shaft connected to the ring gear;
   an output shaft connected to the planet carrier;
   at least one planetary gear rotatably mounted to the planet carrier and engaged with the sun gear;
   at least one planetary gear rotatably mounted to the planet carrier and engaged with the ring gear;
   a clutch drum connected to the sun gear, the clutch drum having first and second sides, the first side having a friction disc affixed thereto;
   a clutch pressure plate connected to the clutch-drum, the clutch pressure plate having first and second sides, the second side having a friction disc affixed thereto;
   a clutch backing plate connected to the clutch drum, the clutch backing plate having a plurality of apertures therein, the clutch backing plate also having first and second sides, the first side having a friction disc affixed thereto;
   a clutch disc interposed between the second side of the clutch pressure plate and the first side of the clutch backing plate and affixed to the output shaft;
   a clutch release plate having first and second sides with a plurality of projections extending from the first side, the plurality of projections matingly engaging the plurality of apertures in the clutch backing plate and extending completely therethrough, the clutch release plate also having a friction disc affixed to the second side thereof;
   a housing extension rigidly affixed to the housing and interposed between the planet carrier and the first side of the clutch drum;
   a piston cavity formed in the housing, the piston cavity having a hydraulic passage in fluid communication with a source of fluid pressure;
   a piston slidably disposed in the piston cavity, the piston having a contact face opposing the friction disc and second side of the clutch release plate;
   a clutch apply spring interposed between the second side of the clutch drum and the first side of the clutch pressure plate; and,
   a brake return spring interposed between the first side of the clutch drum and the planet carrier;
wherein the clutch pressure plate is biased into engagement with the clutch disc by the clutch apply spring and when pressurized hydraulic fluid is introduced into the piston cavity, the piston is moved into engagement with the clutch release plate at which point the projections extending through the clutch backing plate engage the clutch pressure plate thereby overcoming a bias force provided by the clutch apply spring and moving the clutch pressure plate out of engagement with the clutch disc and simultaneously moving the clutch drum into engagement with the housing extension to provide braking of the sun gear thereby slowing the planet carrier and the output and when fluid is drained from the piston cavity the brake return spring moves the clutch drum out of engagement with the housing extension and simultaneously the clutch apply spring moves the clutch pressure plate back into engagement with the clutch disc causing all elements of the transmission to rotate at the same speed resulting in a direct drive.

* * * * *